United States Patent [19]
Lee et al.

[11] Patent Number: 5,694,285
[45] Date of Patent: Dec. 2, 1997

[54] OVERCURRENT AUTOMATIC PREVENTION APPARATUS HAVING AN INDIVIDUAL FAULT DISPLAY AND PERMANENT GROUND FUNCTIONS

[75] Inventors: Kyung-Jae Lee; Se-Jung Yong; Ki-Ho Chung, all of Seoul, Rep. of Korea

[73] Assignee: Korea Basic Science Institute, Daejon, Rep. of Korea

[21] Appl. No.: 604,435

[22] Filed: Feb. 21, 1996

[30] Foreign Application Priority Data

Aug. 28, 1995 [KR] Rep. of Korea ............... 22553/1995

[51] Int. Cl.⁶ ...................................................... H02H 9/04
[52] U.S. Cl. .......................................... 361/119; 340/650
[58] Field of Search ........................... 361/56, 57, 91, 361/93, 111, 103, 106, 117–119, 124, 126, 127; 340/635, 638, 657, 660, 662, 649, 650, 654, 664; 337/15, 19, 37, 52, 53, 32; 324/556

[56] References Cited

U.S. PATENT DOCUMENTS 5,424,901 6/1995 Frederiksen et al. ............... 361/119

FOREIGN PATENT DOCUMENTS

UM949172 4/1994 Rep. of Korea.

Primary Examiner—Ronald W. Leja
Attorney, Agent, or Firm—Christie, Parker & Hale, LLP

[57] ABSTRACT

An improved overcurrent automatic prevention apparatus having an individual fault display and permanent ground functions capable of automatically detecting whether overcurrent flows to a switch, which occurs due to a short of communication cables and properly limiting the overcurrent flow thereto, and when overcurrent exceeding a threshold value continuously flows thereto, permanently blocking a cable line and a ground side so as to prevent characteristic changes of a current limiting device and system breakage, and when it is possible to individually display fault states in order to easily check the system by providing an individual fault display device, visually checking a switch, and preventing possible faults in the system, thus increasing the efficiency of the operation, management and maintenance of the communication system, which includes a melting insulation material deposited on the upper surface of an input terminal of the semiconductor; a ground-side spring contact point disposed on the melting insulation material and connected to the ground; and a fault display lamp-side spring contact point disposed on the melting insulation material and connected to a fault display lamp receiving power.

13 Claims, 5 Drawing Sheets

OVERCURRENT AUTOMATIC PREVENTION APPARATUS HAVING AN INDIVIDUAL FAULT DISPLAY AND PERMANENT GROUND FUNCTIONS

BACKGROUND OF THE INVENTION

1. Field of the Invention

The present invention relates to an overcurrent automatic prevention apparatus having an individual fault display and permanent ground functions, and particularly to an improved overcurrent automatic prevention apparatus having an individual fault display and permanent ground functions capable of automatically detecting whether overcurrent flows to a switch, which occurs due to a short of communication cables, and properly limiting the overcurrent flow thereto, and when the overcurrent exceeding a threshold value continuously flows thereto, permanently blocking a cable line and a ground side so as to prevent characteristic changes of a current limit device and system breakage, and being able to individually display fault states so as to easily check the system by providing an individual fault display device, and preventing possible faults in the system, thus increasing the efficiency of the operation, management and maintenance of the communication system.

2. Description of the Prior Art

A snap type overcurrent prevention apparatus having a fault display function is disclosed in Korean Utility Model Application Ser. No. 94-9172, which is filed by the inventor of this invention. It is directed to switching a one directional snap-type variable connection bar and a bidirectional snap-type variable connection bar when overcurrent is detected, and to provide a fault display unit between a fixed contact point and ground, so that fault caused by an overcurrent can be visually checked.

Figure 1A:
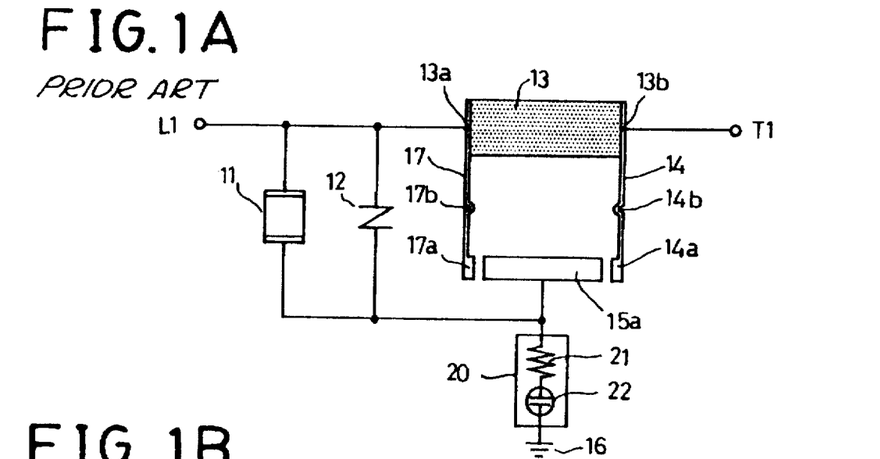
FIG. 1A is a circuit diagram of a snap-type overcurrent automatic prevention apparatus having a conventional display function when a normal current is applied thereto.
Figure 1B:
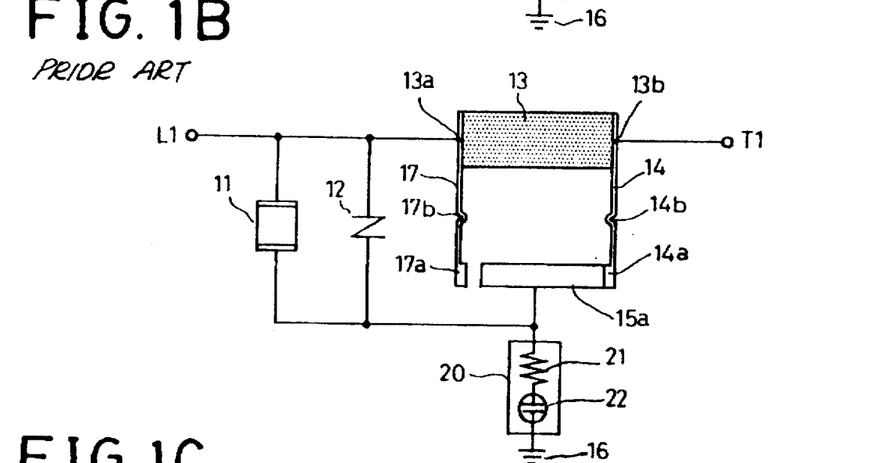
FIG. 1B is a circuit diagram of a snap-type overcurrent automatic prevention apparatus having a conventional display function when an overcurrent is applied thereto.
Figure 1C:
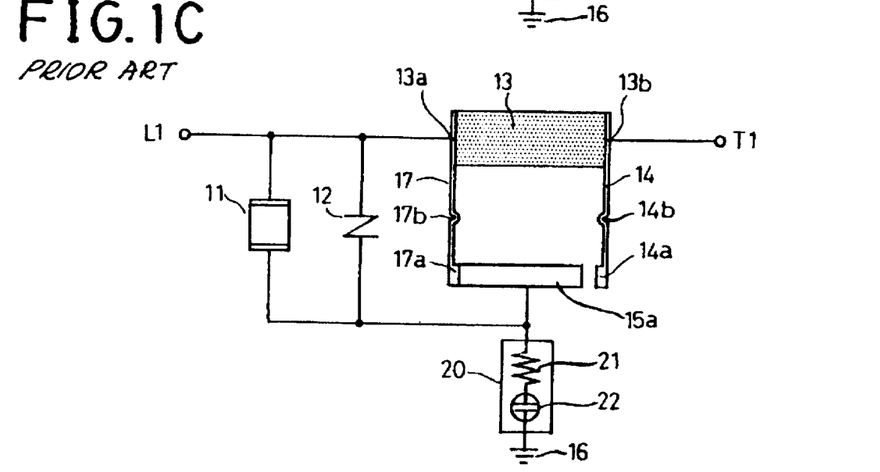
FIG. 1C is a circuit diagram of a snap-type overcurrent automatic prevention apparatus having a conventional display function when an overcurrent is continuously applied thereto and permanently connected to the ground.

FIG. 1A shows a snap-type overcurrent automatic prevention apparatus having a conventional display function when a normal current is applied thereto, and FIG. 1B shows a circuit diagram of a snap-type overcurrent automatic prevention apparatus having a conventional display function when an overcurrent is applied thereto, and FIG. 1C shows a snap-type overcurrent automatic prevention apparatus having a conventional display function when an overcurrent is continuously applied thereto and permanently connected to the ground.

As shown therein, a subscriber line L1 is connected to ground 16 through a gas tube 11, which is an overcurrent prevention device, and oxide zinc varistor 12. Overcurrent is prevented from flowing to the subscriber line L1 by discharging the overcurrent to ground 16, so that devices of the switch are protected from the overcurrent applied thereto through the subscriber line L1. The subscriber line L1 is connected to an electrode contact point 13a of a semiconductor resistance device 13. A one directional snap-type variable connection bar 17 and a bidirectional snap-type variable connection bar 14 each having a different temperature, are connected to the electrode contact point 13a and the electrode contact point 13b of the semiconductor resistance device 13. A dynamic contact point 17a of the one directional snap-type variable connection bar 17 is switched, and a dynamic contact point 14a of the bidirectional snap-type variable connection bar 14 of the switch-side line T1 is switched. A fault display unit 20 consisting of resistance 21 and a discharging lamp 22 is connected between the fixing contact point 15a and ground 16. In addition, the one directional snap-type variable connection bar 17 and the bidirectional snap-type variable connection bar 14 having curved portions 17b and 14b formed at their intermediate portion are made to be a snap-type, respectively. In addition, the one directional snap-type variable connection bar 17 has a certain temperature higher than the bidirectional snap-type variable connection bar 14.

The operation of a conventional overcurrent automatic prevention apparatus having an individual fault display and permanent ground functions will now be explained with reference to the accompanying drawings.

To begin with, when overcurrent flows to the subscriber line L1, the overcurrent is discharged to ground 16 through the gas tube 11 and the oxide zinc varistor 12, so that the flow of the over-current toward the switch-side line T1 is blocked, thus protecting the switch from the overcurrent. In addition, when normal current voltage flows to the semiconductor resistance device 13 from the subscriber line L1, heat does not occur at the semiconductor resistance device 13. Therefore, since the dynamic contact point 14a of the bidirectional snap type variable connection bar 14 and the contact point 17a of the one directional variable connection bar 17 are opened, as shown in FIG. 1A, the normal current flows to the switch-side line T1 through the semiconductor resistance device 13 so that normal communication is possible.

However, when overcurrent is abruptly applied to the subscriber line L1 due to a short of the cables in the system, the resistance level of the semiconductor resistance device 13 is sharply increased by the overcurrent applied thereto, so that it is necessary to limit the amount of the current flowing to the semiconductor resistance device 13. At this time, heat occurs at the semiconductor resistance device 13 due to the increased resistance value of the semiconductor resistance device 13. When the temperature at the semiconductor resistance device 13 is higher than the temperature of the bidirectional snap-type variable connection bar 14, the bidirectional snap-type variable connection bar 14 is instantly operated by the curved portion 14b, so that the dynamic contact point 14a is connected to the fixing contact point 15a as shown in FIG. 1B. Therefore, the overcurrent from the subscriber line L1 flows toward ground 16 through the semiconductor resistance device 13, the bidirectional snap-type variable connection bar 14, and the fault display unit 20, so that the overcurrent is blocked from flowing toward the switch-side line T1, thus protecting the switch from the overcurrent from the subscriber line L1.

In addition, it is possible to check whether overcurrent is applied to the system by visually checking the discharging lamp 22 of the fault display unit 20.

As the overcurrent is eliminated, the resistance value of the semiconductor resistance device 13 is lowered to its normal state, undesired heating thereof is prevented, and the bidirectional snap-type variable connection bar 14 is automatically releases from the fixing contact point 15a, and as shown in FIG. 1A, so that a normal operation can resume.

Meanwhile, when overcurrent is continuously applied to the subscriber line L1, a relatively high temperature occurs at the semiconductor resistance device 13. At this if, the temperature at the semiconductor resistance device 13 is higher than the one directional snap-type variable connection bar 17, the one directional snap-type variable connection bar 17 is snap-operated by its curved portion 17b, and the dynamic contact point 17a is connected to the fixed contact point 15a as shown in FIG. 1C, and the overcurrent from the subscriber line L1 flows to ground 16 through the one directional snap-type variable connection bar 17 and the fault display unit 20, so that the overcurrent flowing toward the semiconductor resistance device 13 can be blocked. In addition, after the one directional snap-type variable connection bar 17 is disconnected from the fixing contact point 15a, the temperature of the heat at the semiconductor resistance device 13 is decreased, and the one directional snap-type variable connection bar 17 disconnects from the fixed contact point 15a. Therefore, it is possible to prevent fire, system breakage, and circuit disconnection of the semiconductor resistance device 13.

In addition, the discharging lamp 22 of the fault display unit 20 operates due to the overcurrent applied to the fault display unit 20, so that it is possible to visually check fault of the system.

As described above, the conventional overcurrent automatic prevention apparatus having an individual fault display and permanent ground functions is directed to prevent overcurrent from flowing to the switch-side T1 through the semiconductor resistance device 13 because the initial resistance value is sharply increased from a few ohms (Ω) to tens of kilo ohms (kΩ). The bidirectional snap-type variable connection bar 14 and the one directional snap-type variable connection bar 17 are directed to discharge using the heat generated by the overcurrent so as to light the discharging lamp, so that it is possible to protect the switch-side line T1 and to check the operation state of the system by checking the turning state of the discharging lamp.

However, if an overcurrent that is higher than a normal current level is instantaneously applied, the bidirectional variable connection bar 14 is connected to the fault display unit 20 and ground 16, and the fault display unit 20 is turned on. That is, even though the semiconductor resistance device 13 is operating normally the fault display unit 20 erroneously turned on. In addition, if a current having a level that is much higher than the threshhold value or if a continuous flow of overcurrent is applied thereto, the one directional variable connection bar 17 is permanently connected to ground 16, and causes the fault display unit 20 to be turned on, and thus it is hard to check whether the system truly malfunctioning.

In addition, in order to limit the current flow of the discharging lamp 22 of the fault display unit 20, since the resistance device 12 having a resistance of tens of kΩ connected to ground 16 in series has a relatively greater resistance compared with the resistance of the switch-side line T1, the overcurrent is not likely to be discharged to ground 16. That is, the overcurrent may disadvantageously flow to the switch-side line T1, thus the system of the switch-side line T1 cannot be quickly and properly protected.

SUMMARY OF THE INVENTION

Accordingly, it is an object of the present invention to provide an overcurrent automatic prevention apparatus having individual fault display and permanent ground functions, which overcome the problems encountered in a conventional overcurrent automatic prevention apparatus having an individual fault display and permanent ground functions.

It is another object of the present invention to provide an improved overcurrent automatic prevention apparatus having an individual fault display and permanent ground functions capable of automatically detecting whether overcurrent flows to a switch, which occurs due to a short of communication cables and properly limiting the overcurrent flow thereto, and when overcurrent exceeding a threshold value continuously flows thereto, permanently blocking a cable line and a ground side so as to prevent characteristic changes of a current limiting device and system breakage, and when it is possible to individually display fault states in order to easily check the system by providing an individual fault display device, visually checking a switch, and preventing possible faults in the system, thus increasing the efficiency of the operation, management and maintenance of the communication system.

To achieve the above objects, there is provided an overcurrent automatic prevention apparatus having an individual fault display and permanent ground functions, which includes a melting insulation material deposited on the upper surface of an input terminal of the semiconductor; a ground-side spring contact point disposed on the melting insulation material and connected to the ground; and a fault display lamp-side spring contact point disposed on the melting insulation material and connected to a fault display lamp receiving power.

DETAILED DESCRIPTION OF THE INVENTION

Figure 2A:
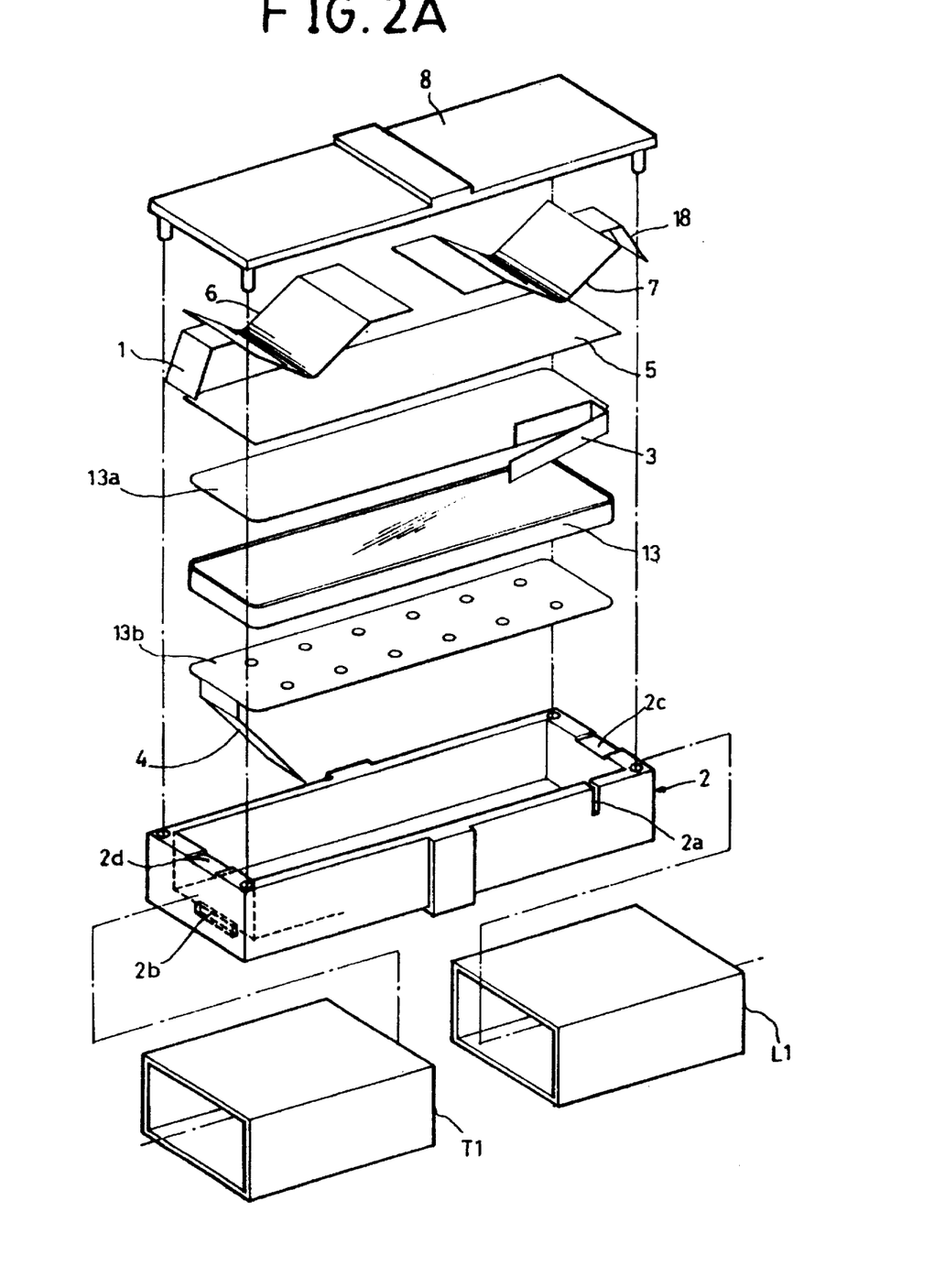
FIG. 2A is a perspective view of an overcurrent automatic prevention apparatus having an individual display and permanent ground functions according to the present invention.
Figure 2B:
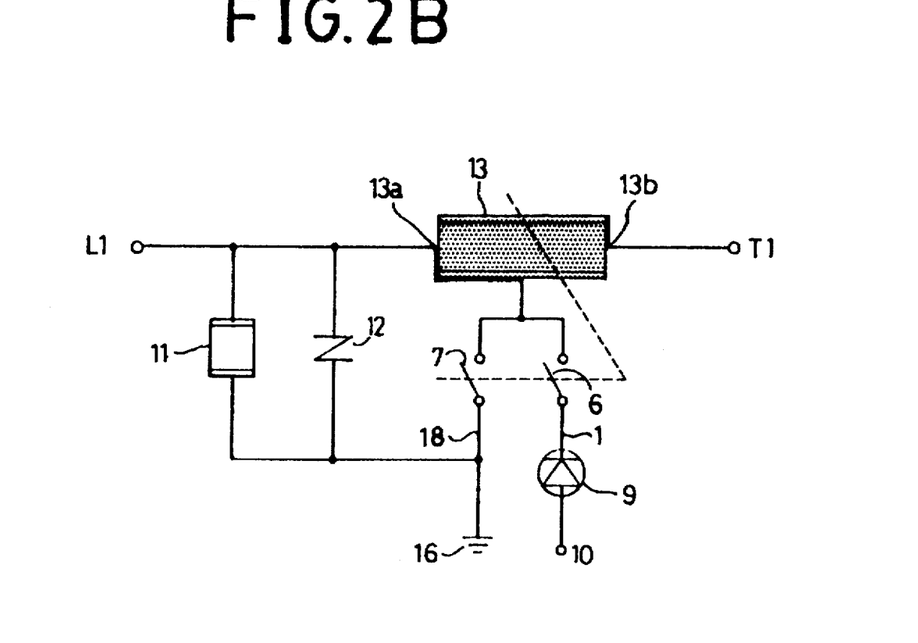
FIG. 2B is a circuit diagram of an equivalent circuit of a normal state of an overcurrent automatic prevention apparatus having an individual display and permanent ground functions according to the present invention.
Figure 2C:
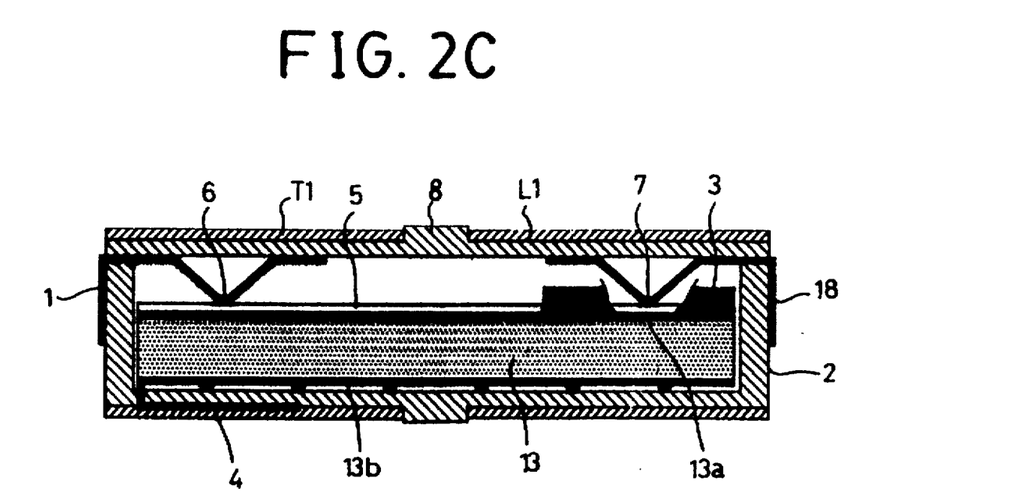
FIG. 2C is a cross-sectional view of an overcurrent automatic prevention apparatus having an individual display and permanent ground functions when it is in a normal operation state.
Figure 2D:
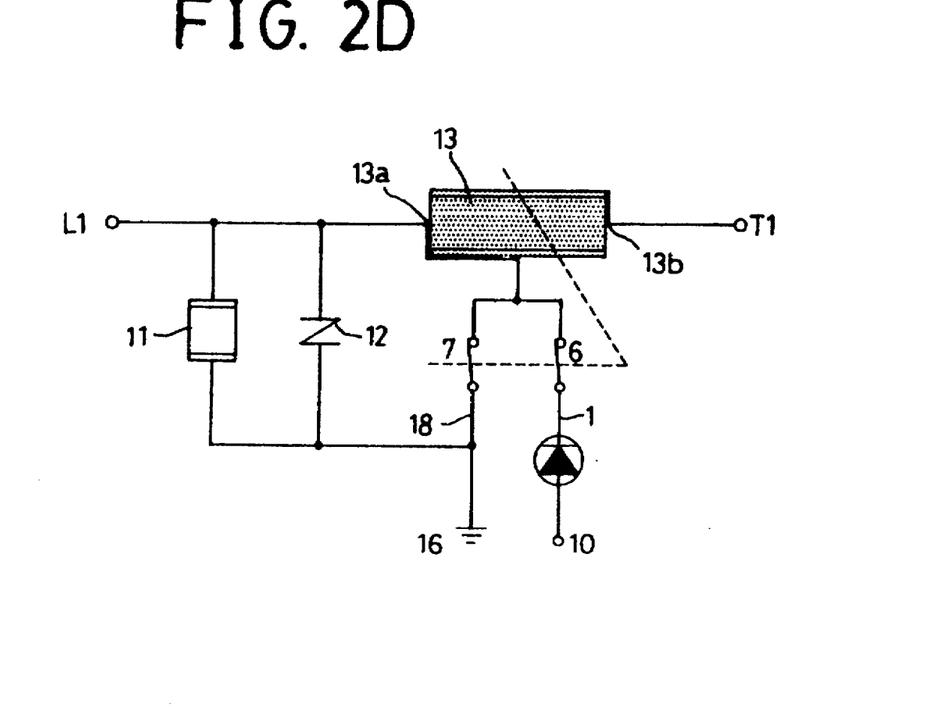
FIG. 2D is a circuit diagram of an equivalent circuit of a normal state of an overcurrent automatic prevention apparatus having an individual display and permanent ground functions according to the present invention when an individual fault display and permanent ground functions are in operation when overcurrent is continuously applied thereto.
Figure 2E:
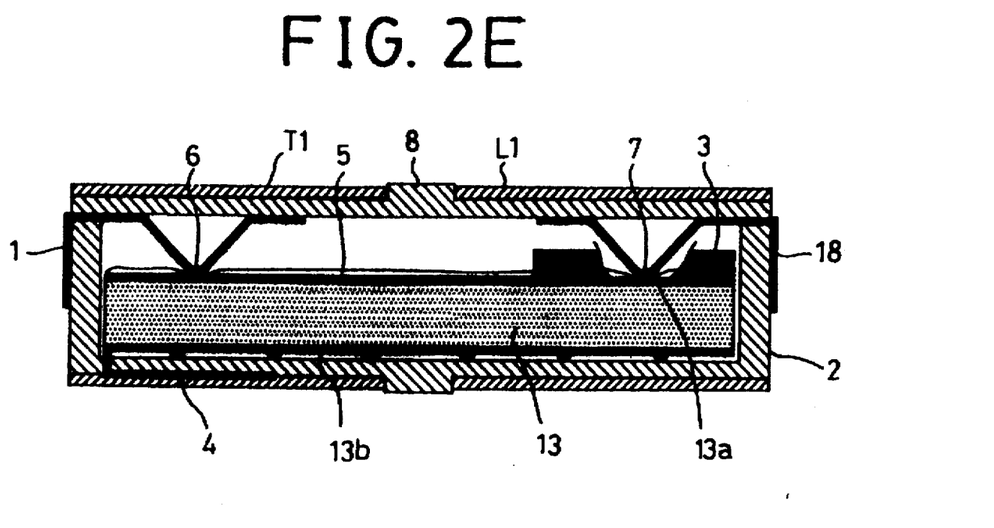
FIG. 2E is a cross-sectional view of an overcurrent automatic prevention apparatus having an individual display and permanent ground functions according to the present invention so as to show an operational state when overcurrent is continuously applied thereto.
Figure 2F:
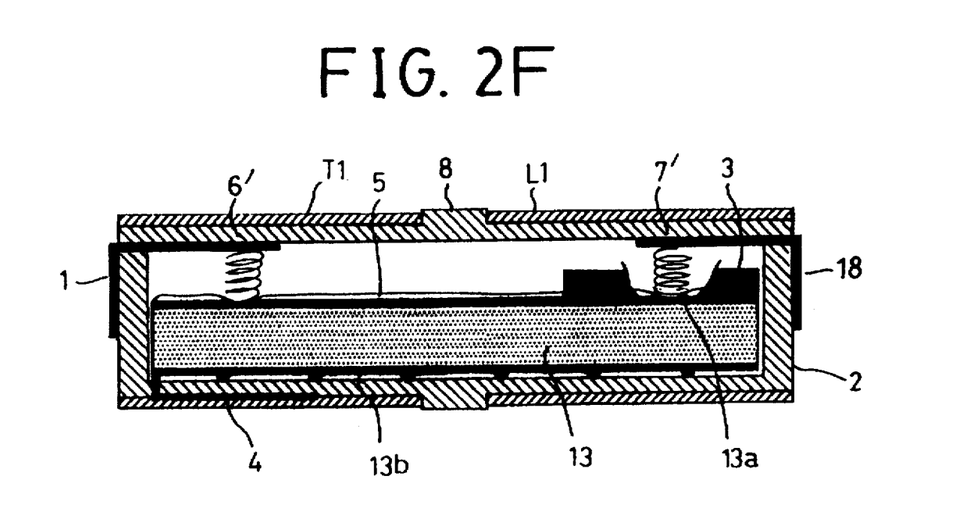
FIG. 2F is a cross-sectional view of an overcurrent automatic protection apparatus having an individual display and permanent ground functions using coil spring contacts according to the present invention so as to show an operational state when overcurrent is continuously applied thereto.
Figure 2G:
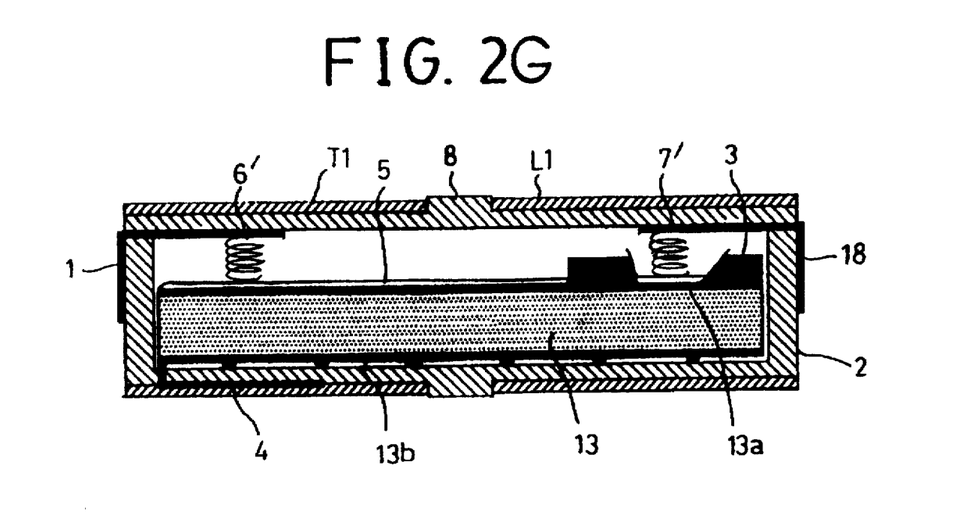
FIG. 2G is a cross-sectional view of an overcurrent automatic prevention apparatus having an individual display and permanent ground function using coil spring contacts when it is in a normal operation state.

FIG. 2A shows an overcurrent automatic prevention apparatus having an individual display and permanent ground functions, and FIG. 2B shows an equivalent circuit of a normal state of an overcurrent automatic prevention apparatus having an individual display and permanent ground functions, and FIG. 2C is a cross-sectional view of an overcurrent automatic prevention apparatus having an individual display and permanent ground functions when it is in a normal operational state, and FIG. 2D shows an equivalent circuit of a normal state of an overcurrent automatic prevention apparatus having an individual display and permanent ground functions according to the present invention when an individual fault display and permanent ground functions are in operation when overcurrent is continuously applied thereto, and FIG. 2E shows an overcurrent automatic prevention apparatus having an indivisional display and permanent ground functions according to the present invention in order to show an operational state when overcurrent is continuously applied thereto. FIG. 2F is a cross-sectional view of an overcurrent automatic protection apparatus having an individual display and permanent ground functions using coil spring contacts according to the present invention so as to show an operational state when overcurrent is continuously applied thereto, and FIG. 2G is a cross-sectional view of an overcurrent automatic prevention apparatus having an individual display and permanent ground function using coil spring contacts when it is in a normal operation state.

As shown therein, a subscriber line L1 is connected to ground 16 through a gas tube 11, which is an overcurrent prevention device, and an oxide zinc varistor 12. The overcurrent applied to the subscriber line L1 is discharged to ground 16 so as to protect a switch-side line T1 from the overcurrent. The subscriber line L1 is connected to an input terminal 13a of the semiconductor resistance device 13 which is an overcurrent prevention device. A melting insulation material is formed on the upper surface of the semiconductor resistance device 13, and a ground-side spring contact point 7 and a fault display lamp-side spring contact point 6 are formed on the upper surface thereof, respectively. The switch-side line T1 is connected to an output terminal 13b of the semiconductor resistance device 13. The fault display lamp 9 receiving a voltage 10 is connected to an extension connection terminal 1 of the fault display lamp-side spring contact point 6. The ground 16 is connected with the extension connection terminal 18 of the ground-side spring contact point 7. The melting insulation material 5 is melted by heat at the semiconductor resistance device 13 when overcurrent higher than the threshold level continuously flows to the subscriber line L1 and the semiconductor resistance device 13. The fault display lamp-side spring contact point 6 and the ground-side spring contact point 7 are permanently connected to the input terminal 13a of the semiconductor resistance device 13, so that overcurrent flowing from the subscriber line L1 is blocked from flowing to the switch or other devices. That is, the overcurrent from the subscriber line L1 flows to ground 16 and to the fault display lamp 9, so that it is possible to visually check whether the system is operating normally.

The extension connection terminal 4 of the output terminal 13b of the semiconductor resistance device 13 is connected to the switch-side line T1 through a lower opening 2b of a lower casing 2. An extension connection terminal 3 of the input terminal 13a of the semiconductor resistance device 13 is connected to the subscriber line L1 through a side surface cutaway groove 2a. The extension connection terminal 18 of the ground-side spring contact point 7 and the extension connection terminal 1 of the fault display lamp-side spring contact point 6 are connected to the fault display lamp 9 and ground 16, respectively, through the upper surface cut-away grooves 2c and 2d of the lower casing 2.

In the drawings, reference numeral 8 denotes an upper casing.

The operation of the overcurrent automatic prevention apparatus having an individual fault display and permanent ground functions will now be explained with reference to the accompanying drawings.

To begin with, FIG. 2B shows an equivalent circuit of a normal state of an overcurrent automatic prevention apparatus having an individual display and permanent ground functions, and FIG. 2C shows an overcurrent automatic prevention apparatus having an individual display and permanent ground functions when it is in a normal operational state. As shown therein, the subscriber line L1 is connected to ground 16 through the gas tube 11, which is an overcurrent prevention device, and the varistor device 12. When an overcurrent flows thereto, the overcurrent is discharged to ground 16 so as to protect the switch-side line T1 and load instruments from the overcurrent. When a certain current lower than the threshold voltage level is applied to the subscriber line L1, relatively low heat is generated at the semiconductor resistance device 13, and the melting insulation material 5 is not melted thereby. The ground-side spring contact point 7 and the fault display lamp-side spring contact point 6 are connected to the input terminal 13a of the semiconductor resistance device 13 by the melting insulation material 5, so that the communication system is normally operable.

When overcurrent is continuously applied to the subscriber line L1 or electric charge higher than a normal level is applied thereto, a relatively high temperature is generated at the semiconductor resistance device 13. As shown in FIGS. 2D and 2E, the melting insulation material 5 is melted, and the ground-side spring contact point 7 and the fault display lamp-side spring contact point 6 become directly connected to the input terminal 13a of the semiconductor resistance device 13. The subscriber line L1 connected to the input terminal 13a of the semiconductor resistance device 13 is connected to ground 16 through the extension contact terminal 18 of the ground-side spring contact point 7, so that the switch-side line T1 and load instruments can be quickly protected from the overcurrent. In addition, since the voltage 10 flows to ground 16 through the fault display lamp 9, the fault display lamp-side spring contact point 6, and the ground-side spring contact point 7, the fault display lamp 9 is turned on so as to indicate that overcurrent is applied to the system.

In addition, in this embodiment of the present invention, the ground-side spring contact point 7 and the fault display lamp-side spring contact point 6 can be made with a V-shaped plate spring, however, a coil spring can be adapted to implement the same effects of the present invention.

In an alternative embodiment, the ground-side spring contact point 7' and the fault display lamp-side spring contact 6' are formed with a coil spring contact point as shown in FIG. 2G. The coil spring contact points connect to the input terminal of the semiconductor resistance device when the melting insulation material 5 is melted as shown in FIG. 2F.

As described above, the overcurrent automatic prevention apparatus having an individual fault display and permanent ground functions is directed to preventing the overcurrent from flowing to the switch-side line and load instruments when the overcurrent which is higher than a normal current level is applied to the system, the resistance in the semiconductor resistance device is changed from several ohms (Ω) to tens of kilo ohms (kΩ). In addition, when electrical charge is applied to the system or overcurrent is applied thereto continuously, the melting insulation material 5 is melted by the heat of the semiconductor resistance device 13, and the ground-side spring contact point 7 and the fault display lamp-side spring contact point 6 are automatically connected to the subscriber line L1 and the input terminal 13a of the semiconductor resistance device 13, so that the overcurrent flows to ground 16. In addition, it is possible to check whether overcurrent is applied to the system. Moreover, since the ground-side spring contact point 7 and the fault display lamp-side contact point 6 are more accurately operated, the permanent ground function and the individual fault display functions can be correctly operated, so that reliability of the products, simple fabrication line, and easiness of the assembling process can be achieved. In addition, it is possible to visually check an individual fault state of the system by turning on the fault display lamp, thus increasing the efficiency of the operation, management and maintenance of the communication system.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An overcurrent automatic prevention apparatus having an individual fault display and permanent ground functions wherein a subscriber line is connected to an input terminal of a semiconductor resistance device and a switch-side line is connected to an output terminal of said semiconductor resistance device, comprising:
   a melting insulation material deposited on an upper surface of the input terminal of the semiconductor resistance device;
   a ground-side spring contact, disposed on said melting insulation material, for connecting to ground; and
   a fault display lamp-side spring contact, disposed on the melting insulation material, for connecting to a fault display lamp.

2. The apparatus of claim 1 wherein said melting insulation material comprises a film and is melted by heat which is generated by overcurrent applied to the input terminal of the semiconductor resistance device.

3. The apparatus of claim 2 wherein said ground-side spring contact and said fault display lamp-side spring contact are formed with a V-shaped plate spring contact, respectively, and are connected to the input terminal of the semiconductor resistance device when the melting insulation material is melted.

4. The apparatus of claim 2 wherein said ground-side spring contact and said fault display lamp-side spring contact are formed with a coil spring contact, respectively, and are connected to the input terminal of the semiconductor resistance device when the melting insulation material is melted.

5. The apparatus of claim 1 wherein said ground-side spring contact and said fault display lamp-side spring contact are formed with a V-shaped plate spring contact, respectively, and are connected to the input terminal of the semiconductor resistance device when the melting insulation material is melted.

6. The apparatus of claim 1 wherein said ground-side spring contact and said fault display lamp-side spring contact are formed with a coil spring contact, respectively, and are connected to the input terminal of the semiconductor resistance device when the melting insulation material is melted.

7. The apparatus of claim 1 wherein said ground-side spring contact comprises a contact point disposed on said melting insulating material, and a contact terminal for connecting to ground.

8. The apparatus of claim 1 wherein said fault display lamp-side spring contact comprises a contact point disposed on said melting insulation material, and a contact terminal for connecting to a fault display lamp.

9. The apparatus of claim 1 further comprising a fault display lamp connected between a power source and said fault display lamp-side spring contact.

10. An overcurrent prevention apparatus having an individual fault display and permanent ground functions wherein a subscriber line is connected to an input terminal plate of a semiconductor resistance device and a switch-side line is connected to an output terminal plate of the semiconductor resistance device, the prevention apparatus, comprising:
    an insulation material deposited on an upper surface of the input terminal plate of the semiconductor resistance device, the insulation material being meltable when the temperature of the semiconductor resistance device exceeds a certain level;
    a ground-side contact disposed on the insulation material and connected to ground, the ground-side contact being in electrical contact with the input terminal plate when the insulation material melts;
    a fault display lamp; and
    a fault display lamp-side contact disposed on the insulation material and connected to said fault display lamp, the fault display lamp-side contact being in electrical contact with the input terminal plate when the insulation material melts.

11. The apparatus according to claim 10 wherein the contacts comprise a resilient conductive material.

12. The apparatus according to claim 10 wherein the certain level is a threshold temperature of the semiconductor resistance device.

13. An overcurrent automatic prevention apparatus having an individual fault display and permanent ground functions comprising:
    a semiconductor resistance device having an input terminal for connecting to a subscriber line and an output terminal for connecting to a switch side line;
    a melting insulation material deposited on an upper surface of the input terminal of the semiconductor resistance device;
    a ground-side spring contact, disposed on said melting insulation material, for connecting to ground; and
    a fault display lamp-side spring contact, disposed on the melting insulation material, for connecting to a fault display lamp.

* * * * *

UNITED STATES PATENT AND TRADEMARK OFFICE
CERTIFICATE OF CORRECTION

PATENT NO. : 5,694,285
DATED : December 2, 1997
INVENTOR(S) : Kyung-Jae Lee; Se-Jung Yong; Ki-Ho Chung It is certified that error appears in the above-indentified patent and that said Letters Patent is hereby corrected as shown below:

Column 1, line 30, before "filed" delete "which is".
Column 2, line 55, replace "releases" with -- released --.
Column 2, line 59, replace "At this if," with -- At this time, if --.
Column 3, line 34, after "unit 20" insert -- is --.
Column 3, line 40, after "system" insert -- is --.
Column 5, line 14, replace "indivisional" with -- individual --.

Signed and Sealed this

Sixteenth Day of March, 1999

Attest:

Q. TODD DICKINSON

*Attesting Officer*  *Acting Commissioner of Patents and Trademarks*